(12) United States Patent
Ke

(10) Patent No.: US 11,624,503 B2
(45) Date of Patent: Apr. 11, 2023

(54) WASTE TREATMENT INCINERATOR AND TREATMENT EQUIPMENT INCLUDING THE SAME

(71) Applicant: Shih-Yuan Ke, Chia Yi Hsien (TW)

(72) Inventor: Shih-Yuan Ke, Chia Yi Hsien (TW)

( * ) Notice: Subject to any disclaimer, the term of this patent is extended or adjusted under 35 U.S.C. 154(b) by 147 days.

(21) Appl. No.: 17/333,121

(22) Filed: May 28, 2021

(65) Prior Publication Data

US 2022/0205634 A1 Jun. 30, 2022

(30) Foreign Application Priority Data

Dec. 25, 2020 (TW) ................................. 109146320

(51) Int. Cl.
| | |
|---|---|
| *F23G 5/10* | (2006.01) |
| *B01D 19/00* | (2006.01) |
| *B01D 45/16* | (2006.01) |
| *B01D 53/18* | (2006.01) |
| *F23G 5/46* | (2006.01) |
| *F23J 15/04* | (2006.01) |
| *H05B 6/64* | (2006.01) |

(52) U.S. Cl.
CPC ........... *F23G 5/10* (2013.01); *B01D 19/0052* (2013.01); *B01D 45/16* (2013.01); *B01D 53/185* (2013.01); *F23G 5/46* (2013.01); *F23J 15/04* (2013.01); *H05B 6/6491* (2013.01); *B01D 2252/103* (2013.01); *F23G 2204/203* (2013.01); *F23G 2206/10* (2013.01); *F23G 2900/50202* (2013.01); *F23J 2217/00* (2013.01)

(58) Field of Classification Search
CPC ...................................... F23G 5/10; F23G 5/46
See application file for complete search history.

(56) References Cited

U.S. PATENT DOCUMENTS

| | | | | |
|---|---|---|---|---|
| 4,937,411 A | * | 6/1990 | Suzuki ..................... | H05B 6/80 219/679 |
| 5,191,184 A | * | 3/1993 | Shin ......................... | H05B 6/80 210/186 |
| 5,322,603 A | * | 6/1994 | Kameda .................... | A61L 2/06 204/158.21 |
| 5,363,777 A | * | 11/1994 | Yoshimoto .............. | F23G 5/245 110/216 |
| 5,397,551 A | * | 3/1995 | Won Sam ............... | F23G 5/165 422/186 |

(Continued)

*Primary Examiner* — Nathaniel Herzfeld
(74) *Attorney, Agent, or Firm* — Fresh IP PLC; Clifford D. Hyra; Aubrey Y. Chen

(57) ABSTRACT

A waste treatment incinerator includes a furnace and a microwave transmitting module. The furnace includes a housing defining a treatment space. The furnace includes an activated charcoal layer located in the treatment space. An exhaust pipe is connected to the activated charcoal layer. The microwave transmitting module aligned with the activated charcoal layer. Treatment equipment includes the waste treatment incinerator, a heat exchange system, and a purification module. The heat exchange system includes a first heat exchange module connected to the exhaust pipe of the furnace and a reservoir connected to the first heat exchange module. The purification module includes a gas inlet and a gas outlet. The gas inlet intercommunicates with the first heat exchange module. A sprinkling area is disposed between the gas inlet and the gas outlet.

13 Claims, 2 Drawing Sheets

(56) References Cited

U.S. PATENT DOCUMENTS

| | | | | |
|---|---|---|---|---|
| 5,698,762 A | * | 12/1997 | Dauerman | A62D 3/178 204/157.43 |
| 5,886,326 A | * | 3/1999 | Tang | F23G 5/08 219/679 |
| 6,139,744 A | * | 10/2000 | Spears | A47K 11/023 210/201 |
| 6,534,754 B2 | * | 3/2003 | Schulz | H05B 6/802 219/679 |
| 2011/0303134 A1 | * | 12/2011 | Lim | F23G 5/027 110/235 |

* cited by examiner

WASTE TREATMENT INCINERATOR AND TREATMENT EQUIPMENT INCLUDING THE SAME

BACKGROUND OF THE INVENTION

The present invention relates to a waste treatment incinerator and treatment equipment including the waste treatment incinerator and, more particularly, to a waste treatment incinerator that treats waste with high-temperature flameless treatment and treatment equipment including the waste treatment incinerator.

General waste includes waste generated in daily lives, agricultural waste, medical waste, and industrial waste. A general treating method for the above wastes includes incinerating the wastes in treatment equipment. However, tar contained in waste or biomass waste will emerge together with the gases generated from carbonization, causing pollution. Even if the gas generated after carbonization of the waste is controlled within the treatment equipment, the tar will block the valves, pipes, and devices of the treatment equipment, causing corrosion.

In view of the above, improvement to the conventional waste treatment equipment is still required.

BRIEF SUMMARY OF THE INVENTION

To solve the above disadvantages, an objective of the present invention is to provide a waste treatment incinerator that can avoid damage to equipment by gases generated in the treatment.

Another objective of the present invention is to provide a waste treatment incinerator providing improved operation safety.

A further objective of the present invention is to provide waste treatment equipment for reusing the products generated after treatment of the waste.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

As used herein, the term "one" or "an" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling", "join", "assembly", or similar terms is used to include separation of connected members without destroying the members after connection or inseparable connection of the members after connection. A person having ordinary skill in the art would be able to select according to desired demands in the material or assembly of the members to be connected.

A waste treatment incinerator according to the present invention comprises a furnace and a microwave transmitting module. The furnace includes a housing defining a treatment space. The furnace includes an activated charcoal layer located in the treatment space. An exhaust pipe is connected to the activated charcoal layer. The microwave transmitting module aligned with the activated charcoal layer.

Treatment equipment according to the present invention comprises the waste treatment incinerator, a heat exchange system, and a purification module. The heat exchange system includes a first heat exchange module connected to the exhaust pipe of the furnace and a reservoir connected to the first heat exchange module. The purification module includes a gas inlet and a gas outlet. The gas inlet intercommunicates with the first heat exchange module. A sprinkling area is disposed between the gas inlet and the gas outlet.

Thus, in the waste treatment incinerator according to the present invention, the temperature of the activated charcoal layer irradiated by the microwaves of the microwave transmitting module is continuously increased in a controlled manner. The activated charcoal layer can emit high temperature, and the activated charcoal layer can crack the waste contacted with the high heat can crack into a gas by the heat energy. The gas generated after pyrolysis of the waste flows downwards through the activated charcoal layer to proceed with filtration of the gas and further pyrolysis, avoiding damage to the waste treatment incinerator by the harmful substances in the gas, and thereby prolonging the service life of the waste treatment incinerator.

Furthermore, in the treatment equipment according to the present invention, the heat exchange system significantly lowers the temperature of the gas discharged from the waste treatment incinerator, such that the gas can be sent into the purification module for removing the harmful substances from the gas. A non-polluting gas mixture containing carbon monoxide and hydrogen can be utilized, increasing the added value of the waste.

In an example, the furnace includes a thermally insulating layer surrounding the treatment space. Thus, the thermally insulating layer can avoid the heat generated from treatment of the waste from being transferred to the housing, avoiding operators from scalding.

In an example, the furnace includes an ash accumulation area located below the activated charcoal layer, and an isolating member is disposed between the activated charcoal layer and the ash accumulation area. Thus, carbonized particulates and ash generated after pyrolysis of the waste by the activated charcoal layer can fall into and accumulate in the ash accumulation area, permitting a user to easily clean the carbonized particulates and the ash to thereby keep the furnace clean.

In an example, the furnace includes a vapor input pipe intercommunicating with the treatment space. Thus, the vapor input pipe can input vapor into the treatment space to preheat the waste, increasing the pyrolysis efficiency of the waste.

In an example, the first exchange module intercommunicates with the treatment space of the furnace via a vapor conveying pipe. Thus, the vapor generated by the first heat exchange module can be conveyed into the treatment space to preheat the waste, increasing the pyrolysis efficiency of the waste.

In an example, the treatment equipment further comprises a circulating pipeline intercommunicating with the reservoir, the second heat exchange module, and the third heat exchange module in sequence. Thus, the gas can pass through the second heat exchange module and the third heat exchange module in sequence, further lowering the temperature of the gas.

In an example, the treatment equipment further comprises a circulating pipeline intercommunicating with the reservoir, the second heat exchange module, and the third heat exchange module in sequence. Thus, the cooling liquid in the reservoir can be continuously supplied to the second heat exchange module and the third heat exchange module, increasing the heat exchange efficiency of the gas.

In an example, the heat exchange system includes a first gas-liquid separator and a second gas-liquid separator, wherein the first gas-liquid separator is connected in between a gas outlet of the second heat exchange module and the second pipe, and wherein the second gas-liquid separator is connected in between a gas outlet of the third heat exchange module and the third pipe. Thus, the tar and pyroligneous acid residing in the gas can be recovered by condensation, increasing the added valve of the waste.

In an example, the heat exchange system includes an impurity separator disposed on the first pipe. Thus, the gas after treatment by the furnace can pass through the impurity separator via the first tube to remove un-gasified particulates from the gas, increasing the purification efficiency of the gas.

The present invention will become clearer in light of the following detailed description of illustrative embodiments of this invention described in connection with the drawings.

DETAILED DESCRIPTION OF THE INVENTION

Figure 1:
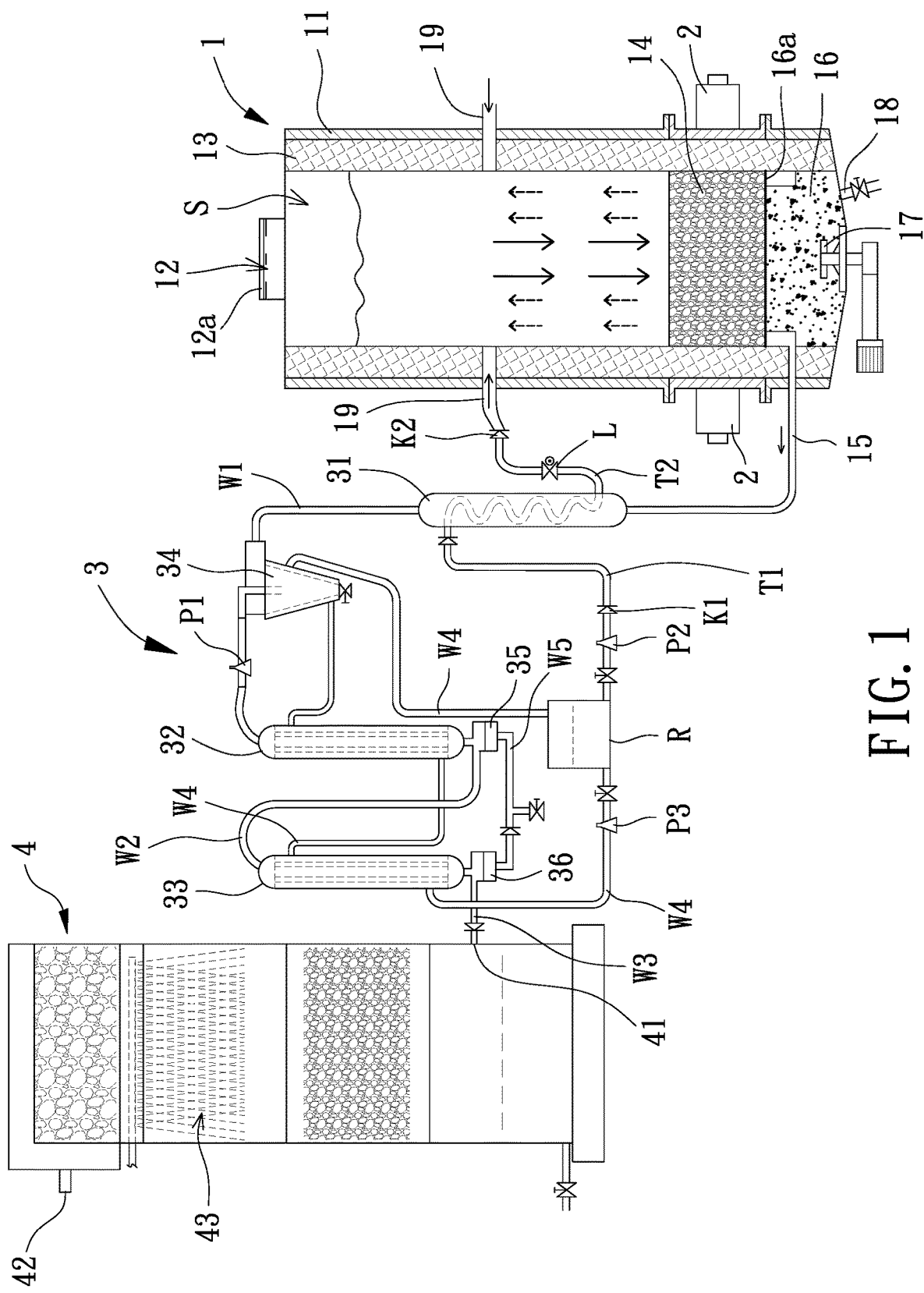
FIG. 1 is a diagrammatic view of treatment equipment of an embodiment according to the present invention.

With reference to FIG. 1, treatment equipment of an embodiment according to the present invention comprises a furnace 1 and a microwave transmitting module 2. The microwave transmitting module 2 faces the furnace 1.

The furnace 1 can receive waste to be treated. The furnace 1 can be integrally formed or comprised of a plurality of casings to permit easy assembly, cleaning, and maintenance. The furnace 1 includes a housing 11 defining a treatment space S. The furnace 1 includes a feeding inlet 12 and a cover 12a for closing the feeding inlet 12. The waste can be fed through the feeding inlet 12. The feeding inlet 12 can be located in an upper end of the housing 11. The feeding inlet 12 intercommunicates with the treatment space S, such that the waste can fall into the treatment space S via the feeding inlet 12. The cover 12a can be used to open or close the feeding inlet 12 by way of controlling a gate. However, the present invention is not limited in this regard. The furnace 1 can include a thermally insulating layer 13 surrounding the treatment space S. The thermally insulating layer 13 can be in the form of an inorganic material layer made of a material with a low thermal conductivity, such as bricks. Alternatively, the thermally insulating layer 13 can be a hollow layer. For example, the thermally insulating layer 13 can be formed by an inner casing spaced from the housing 11. Furthermore, the thermally insulating layer 13 can include both the inorganic layer and the hollow layer to increase the thermal insulation effect. The present invention is not limited in this regard. Thus, the thermally insulating layer 13 can avoid the operator from being scalded by the heat (generated from treatment of the waste) transmitted from the waste to the housing 11.

The furnace 1 includes an activated charcoal layer 14 filled with activated charcoal particulates that have been burned and that have gaps therebetween. The activated charcoal layer 14 is located below the treatment space S. The furnace 1 can process the waste by the activated charcoal layer 14 to pyrolyze the waste. In this embodiment, the activated charcoal layer 14 is adjacent to a bottom of an interior of the furnace 1, such that the waste can be stacked above the activated charcoal layer 14. The furnace 1 includes an exhaust pipe 15 intercommunicating with the activated charcoal layer 14. The gas produced from pyrolysis of the waste passes through the gaps in the activated charcoal layer 14 and is then discharged via the exhaust pipe 15. A fluid driving device, such as a pump P1, can be used to drive the gas in the exhaust pipe 15 to flow, increasing the discharge efficiency of the gas.

Preferably, the furnace 1 further includes an ash accumulation area 16 disposed below the activated charcoal layer 14. Thus, carbonized particulates and ash generated after pyrolysis of the waste by the activated charcoal layer 14 can fall into and accumulate in the ash accumulation area 16, permitting a user to easily clean the carbonized particulates and the ash. Furthermore, to prevent the activated charcoal particulates in the activated charcoal layer 14 from falling into the ash accumulation layer 16, an isolating member 16a can be disposed between the activated charcoal layer 14 and the ash accumulation area 16. The isolating member 16a can include pores having diameters smaller than the diameter of the activated charcoal particulates. Alternatively, the isolating member 16a can be in the form of a mesh structure having holes with diameters smaller than the diameter of the activated charcoal particulates. Thus, the carbonized particulates and the ash after pyrolysis of the waste can pass through the isolating member 16a, but the activated charcoal particulates will not fall. Furthermore, the housing 1 can include upper and lower housing parts that can be detachably coupled together at the position of the activated charcoal layer 14 in the housing 1. The detachable coupling can be threading connection. Thus, the worker can easily proceed with installation, maintenance, and cleaning of the activated charcoal layer 14.

The furnace 1 can further include a stirring member 17 for stirring the carbonized particulates and the ash in the ash accumulation area 16. In this embodiment, the stirring member 17 can be located at the bottom of the furnace 1 and can be driven by a conventional driving device, such as a motor. The bottom of the furnace 1 can include a charcoal exit 18. Thus, the carbonized particulates and the ash generated after pyrolysis of the waste can be stirred by the stirring member 17 and, thus, can be discharged via the charcoal exit 18. Furthermore, the furnace 1 preferably includes a vapor input pipe 19 intercommunicating with the treatment space S. Vapor can be conveyed into the treatment space S by the vapor input pipe 19. Thus, the waste can be preheated by the vapor. Furthermore, a chemical reaction $H_2O+C=H_2+CO$ can undergo to produce a large quantity of a gas mixture of carbon monoxide and hydrogen that can be utilized, increasing the pyrolysis efficiency of the waste.

Figure 2:
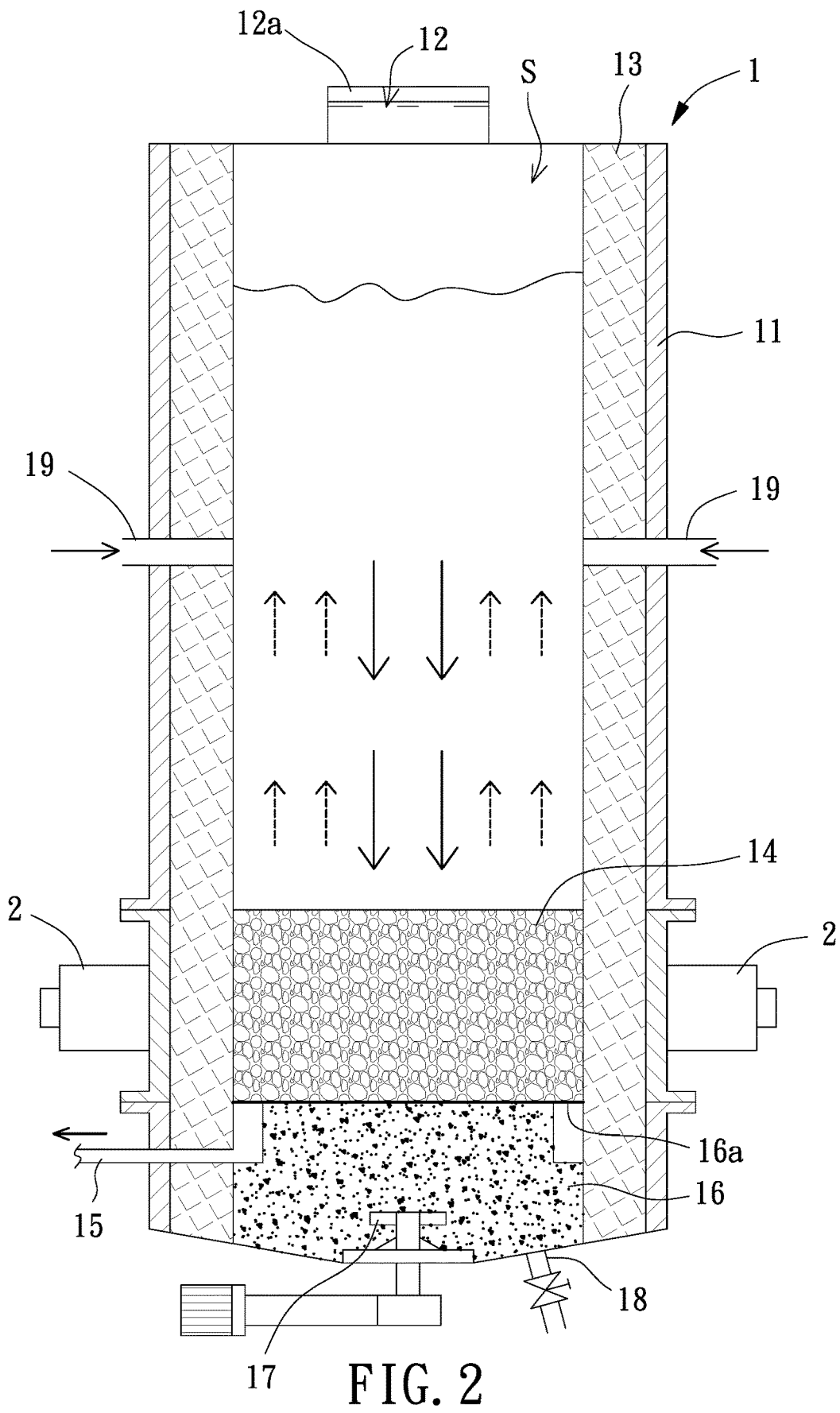
FIG. 2 is a diagrammatic view of a waste treatment incinerator of an embodiment according to the present invention.

With reference to FIGS. 1 and 2, the microwave transmitting module 2 is aligned with the activated charcoal layer 14 to emit microwaves to the activated charcoal layer 14. Thus, the activated charcoal layer 14 can immediately reach a high temperature by way of controlling the temperature. When the temperature is sufficiently high, the waste contacted with the high heat can be pyrolyzed by the high heat and turn into a molecular form. The microwave transmitting module 2 can include a microwave transmitting device, such as a magnetron. In this embodiment, the microwave transmitting module 2 can be coupled to the housing 1, and the microwaves transmit through the housing 11 and the thermally insulating layer 13, such that the activated charcoal layer 14 can completely absorb the microwaves, and the activated charcoal layer 14 is irradiated by the microwaves can be continuously heated in a controlled manner to working temperatures required for pyrolysis of various wastes. Furthermore, a plurality of microwave transmitting modules 2 can be disposed around the housing 1 to increase the microwave irradiation efficiency. The present invention is not limited in this regard.

In use of the waste treatment incinerator according to the present invention, the waste can be placed into the treatment space S to stack the waste above the activated charcoal layer 14. When the activated charcoal layer 14 is irradiated by the microwaves of the microwave transmitting module 2, the temperature of the activated charcoal layer 14 can be increased to a predetermined working temperature. For example, the temperature of the activated charcoal layer 14 can be increased up to 700-1600° C., such that the temperature of the activated charcoal layer 14 is higher than the burning point of the waste. Thus, the waste can be smoldered and destroyed in a state with a little amount of oxygen or without oxygen. As a result, the unburned charcoal burns automatically and cracks and is, therefore, gasified and carbonized. The gas generated after pyrolysis of the waste can pass through the activated charcoal layer 14 which can absorb the organic substances and odorous molecules in the gas to thereby filter the gas. Furthermore, the organic substances and the odorous molecules can be pyrolyzed again through chemical reactions. Thus, the waste treatment incinerator can be prevented from being damaged by the pollutants in the gas. Furthermore, the activated charcoal layer 14 can be irradiated by the microwaves from the microwave transmitting module to increase the temperature thereof. Thus, the activated charcoal layer 14 can automatically burn and catch fire, which improves the safety for the worker carrying out the operation in comparison with a furnace 1 requiring ignition in a sealed space for starting the process.

With reference to FIG. 1, the present invention further provides treatment equipment including the above waste treatment incinerator, a heat exchange system 3, and a purification module 4. The heat exchange system 3 is connected in between the furnace 1 of the waste treatment incinerator and the purification module 4.

The heat exchange system 3 is connected to the exhaust pipe 15 of the furnace 1, such that the heat exchange system 3 can receive the gas generated after pyrolysis of the waste and can lower the temperature of the gas. Then, the gas can be conveyed to the purification module 4 to proceed with subsequent treatment. The heat exchange system 3 includes a first heat exchange module 31 filled with a cooling liquid. The first heat exchange module 31 includes a pipe in the cooling liquid. Thus, the gas flowing through the pipe can proceed with heat exchange with the cooling liquid to lower the temperature of the gas, which can be appreciated by persons skilled in the art. Redundant description is not disclosed herein. The heat exchange system 3 can include a reservoir R that intercommunicates with the first heat exchange module 31 via a liquid conveying pipe T1. Thus, the reservoir R can supply the cooling liquid to the first heat exchange module 31. The liquid conveying pipe T1 can include a pump P2 to drive the fluid in the liquid conveying pipe T1 to flow and can include a check valve K1 to prevent reverse flow of the fluid.

It is worth noting that the temperature of the gas generated from pyrolysis of the waste can be higher than 1200° C. Vapor is formed after heat exchange between the cooling liquid in the first heat exchange module 31 and the gas. Preferably, the first heat exchange module 31 is connected to the vapor input pipe 19 via a vapor conveying pipe T2. Thus, the vapor can be conveyed into the treatment space S to preheat the waste and to proceed with full chemical reaction with the waste. The vapor conveying pipe T2 can include a pressure adjusting valve L for adjusting the pressure and flow of the vapor and a check valve K2 for preventing reverse flow of the vapor.

The heat exchange system 3 can further include a second heat exchange module 32 and a third heat exchange module 33. A first pipe W1 intercommunicates with the first heat exchange module 31 and the second heat exchange module 32. A second pipe W2 intercommunicates with the second heat exchange module 32 and the third heat exchange module 33. A third pipe W3 is connected to the third heat exchange module 33 for discharging the gas. Each of the second heat exchange module 32 and the third heat exchange module 33 includes a cooling liquid and a pipe in the cooling liquid. Thus, the gas can pass through the second heat exchange module 32 and the third heat exchange module 33 in sequence to lower the temperature of the gas.

Furthermore, the reservoir R can supply the cooling liquid to the second heat exchange module 32 and the third heat exchange module 33. In an example, a circulating pipeline W4 intercommunicates with the reservoir R, the second heat exchange module 32, and the third heat exchange module 33 in sequence to permit continuous supply of the cooling liquid in the reservoir R to the second heat exchange module 32 and the third heat exchange module 33, and the cooling liquid flows back to the reservoir R. The circulating pipeline W4 can include a pump P3 to drive the cooling liquid to flow in a circulating manner.

The heat exchange system 3 can further include an impurity separator 34 disposed on the first pipe W1. The impurity separator 34 can be a conventional cyclone dust collector for removing dust and debris passing through the impurity separator 34 by downwardly spinning vortexes, which can be appreciated by one skilled in the art. Redundant description is not disclosed herein. Thus, the gas treated by the furnace 1 can pass through the impurity separator 34 via the first pipe W1 for removing un-gasified particulates from the gas. Preferably, the circulating pipeline W4 can intercommunicate with the impurity separator 34, such that the cooling liquid in the circulating pipeline W4 in the circulating path can lower the temperature of the gas passing through the impurity separator 34.

The heat exchange system 3 can further include a first gas-liquid separator 35 and a second gas-liquid separator 36. The first gas-liquid separator 35 and the second gas-liquid separator 36 can proceed with separation of gas and liquid by conventional gravity settling or centrifugal force, which can be appreciated by one skilled in the art. In this embodiment, the first gas-liquid separator 35 is connected in between a gas outlet of the second heat exchange module 32 and the second pipe W2, and the second gas-liquid separator 36 is connected in between a gas outlet of the third heat exchange module 33 and the third pipe W3. Thus, the first gas-liquid separator 35 and the second gas-liquid separator 36 can recover byproducts, such as tar or pyroligneous acid, in the gas by condensation, and the byproducts can be discharged via a recovery pipe W5 for subsequent storage.

The purification module 4 is connected to the third pipe W3. The purification module 4 can be a conventional cyclone tower to further filter the gas whose temperature has been lowered. The purification module 4 includes a gas inlet 41 and a gas outlet 42. The gas inlet 41 intercommunicates with the third pipe W3. A sprinkling area 43 is disposed between the gas inlet 41 and the gas outlet 42. The sprinkling area 43 can sprinkle cleaning water. Desired additives can be added into the cleaning water to remove harmful substances, such as nitrogen oxides, sulfides, etc. The present invention is not limited in this regard. The gas enters the purification module 4 via the gas inlet 41 and passes through the sprinkling area 43 to proceed with a water bath, thereby removing the harmful substances residing in the gas. Then, the gas is discharged via the gas outlet 42.

In view of the foregoing, in the waste treatment incinerator according to the present invention, the temperature of the activated charcoal layer 14 irradiated by the microwaves of the microwave transmitting module 2 is continuously increased to working temperatures required for pyrolysis of various wastes, providing immediate temperature rise in a controlled manner. The high temperature emitted by the activated charcoal layer 14 cracks the waste contacted with the high heat into a molecular form. The gas generated after pyrolysis of the waste flows downwards through the activated charcoal layer 14 to proceed with filtration of the gas. Furthermore, the organic substances and odorous molecules in the gas can be pyrolyzed again through chemical reactions. The structures of the organic substances and odorous molecules can fully crack to avoid damage to the waste treatment incinerator by the harmful substances in the gas, prolonging the service life of the waste treatment incinerator. Furthermore, in the treatment equipment according to the present invention, the heat exchange system 3 significantly lowers the temperature of the gas discharged from the waste treatment incinerator, such that the gas can be sent into the purification module 4 for removing the harmful substances. A non-polluting gas mixture containing carbon monoxide and hydrogen can be utilized, increasing the added value of the waste.

Although specific embodiments have been illustrated and described, numerous modifications and variations are still possible without departing from the scope of the invention. The scope of the invention is limited by the accompanying claims.

The invention claimed is:

1. A waste treatment incinerator comprising:
   a furnace including a housing defining a treatment space, wherein the furnace includes an activated charcoal layer located in the treatment space, and wherein an exhaust pipe is directly connected to the activated charcoal layer; and
   a microwave transmitting module aligned with the activated charcoal layer to emit microwaves to the activated charcoal layer such that the activated charcoal layer can completely absorb the microwaves.

2. The waste treatment incinerator as claimed in claim 1, wherein the furnace includes a thermally insulating layer surrounding the treatment space.

3. The waste treatment incinerator as claimed in claim 1, wherein the furnace includes an ash accumulation area located below the activated charcoal layer, and wherein an isolating member is disposed between the activated charcoal layer and the ash accumulation area.

4. The waste treatment incinerator as claimed in claim 3, wherein the furnace includes a vapor input pipe intercommunicating with the treatment space.

5. Treatment equipment comprising:
   the waste treatment incinerator as claimed in claim 1,
   a heat exchange system including a first heat exchange module connected to the exhaust pipe of the furnace, and wherein a reservoir is connected to the first heat exchange module; and
   a purification module including a gas inlet and a gas outlet, wherein the gas inlet intercommunicates with the first heat exchange module, and wherein a sprinkling area is disposed between the gas inlet and the gas outlet.

6. Treatment equipment comprising:
   the waste treatment incinerator as claimed in claim 2,
   a heat exchange system including a first heat exchange module connected to the exhaust pipe of the furnace, and wherein a reservoir is connected to the first heat exchange module; and
   a purification module including a gas inlet and a gas outlet, wherein the gas inlet intercommunicates with the first heat exchange module, and wherein a sprinkling area is disposed between the gas inlet and the gas outlet.

7. Treatment equipment comprising:
   the waste treatment incinerator as claimed in claim 3,
   a heat exchange system including a first heat exchange module connected to the exhaust pipe of the furnace, and wherein a reservoir is connected to the first heat exchange module; and
   a purification module including a gas inlet and a gas outlet, wherein the gas inlet intercommunicates with the first heat exchange module, and wherein a sprinkling area is disposed between the gas inlet and the gas outlet.

8. Treatment equipment comprising:
   the waste treatment incinerator as claimed in claim 4,
   a heat exchange system including a first heat exchange module connected to the exhaust pipe of the furnace, and wherein a reservoir is connected to the first heat exchange module; and
   a purification module including a gas inlet and a gas outlet, wherein the gas inlet intercommunicates with the first heat exchange module, and wherein a sprinkling area is disposed between the gas inlet and the gas outlet.

9. The treatment equipment as claimed in claim 5, wherein the first exchange module intercommunicates with the treatment space of the furnace via a vapor conveying pipe.

10. The treatment equipment as claimed in claim 5, further comprising a second heat exchange module and a third heat exchange module, wherein a first pipe intercommunicates with the first heat exchange module and the second heat exchange module, wherein a second pipe intercommunicates with the second heat exchange module and the third heat exchange module, and wherein the third heat exchange module intercommunicates with the purification module.

11. The treatment equipment as claimed in claim 10, further comprising a circulating pipeline intercommunicating with the reservoir, the second heat exchange module, and the third heat exchange module in sequence.

12. The treatment equipment as claimed in claim 10, wherein the heat exchange system includes a first gas-liquid separator and a second gas-liquid separator, wherein the first gas-liquid separator is connected in between a gas outlet of the second heat exchange module and the second pipe, and wherein the second gas-liquid separator is connected in between a gas outlet of the third heat exchange module and a third pipe.

13. The treatment equipment as claimed in claim 5, wherein the heat exchange system includes an impurity separator disposed on a first pipe.

* * * * *